(12) United States Patent
Fukano et al.

(10) Patent No.: US 6,335,071 B1
(45) Date of Patent: Jan. 1, 2002

(54) STORAGE MEMBER

(75) Inventors: Tatsuo Fukano; Naohiko Kato; Yasuhiko Takeda; Akihiro Takeichi; Tomoyoshi Motohiro, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/508,085

(22) PCT Filed: Jul. 13, 1999

(86) PCT No.: PCT/JP99/03784

§ 371 Date: Mar. 14, 2000

§ 102(e) Date: Mar. 14, 2000

(87) PCT Pub. No.: WO00/04536

PCT Pub. Date: Jan. 27, 2000

(30) Foreign Application Priority Data

Jul. 14, 1998 (JP) ............................................. 10-199074

(51) Int. Cl.[7] ................................................. B32B 3/02
(52) U.S. Cl. ...................... 428/64.1; 428/64.4; 428/702; 430/270.11; 369/283; 369/288
(58) Field of Search ............................... 428/64.1, 64.4, 428/702, 913; 430/270.11, 495.1, 945; 369/283, 288

(56) References Cited

U.S. PATENT DOCUMENTS 5,459,018 A    10/1995    Akahira

FOREIGN PATENT DOCUMENTS

| JP | 60-99699 | 6/1985 |
| JP | 2-152029 | 6/1990 |

*Primary Examiner*—Elizabeth Evans
(74) *Attorney, Agent, or Firm*—Oblon, Spivak, McClelland, Maier & Neustadt, P.C.

(57) ABSTRACT

In an optical disk which includes a recording film having a laminated construction, and which records information by changing optical characteristics of the recording film by applying a laser beam, there are laminatedly formed a $WO_3$ film 2 as a second layer, the $WO_3$ requiring energy by about 470 kJ when it dissociates 1 mol of oxygen molecules, an Sn—43 atomic % Bi film 3 which includes Sn as a first layer, the Sn generating energy by about 610 kJ when it bonds with 1 mol of oxygen molecules and having a melting point of about 139° C., and a resin film 4 in this order on a guide groove 1c forming surface 1b of a substrate 1. When a recording laser beam is applied, a part of Sn—43 atomic % Bi film 3 is turned into a liquid phase, both of the films 2 and 3 react, and the optical characteristics of the recording film 10 vary so that information is recorded. As a result, the retention characteristic of the recorded data is secured, and the reactivity of the recording film is enhanced.

4 Claims, 1 Drawing Sheet

1 : SUBSTRATE
1a : GUIDE GROOVE FORMING SURFACE
1c : GUIDE GROOVE
2 : WO3 FILM
3 : Sn—43 atomic %Bi FILM
4 : RESIN FILM
10 : RECORDING FILM 1 : SUBSTRATE
1a : GUIDE GROOVE FORMING SURFACE
1c : GUIDE GROOVE
2 : WO3 FILM
3 : Sn—43 atomic %Bi FILM
4 : RESIN FILM
10 : RECORDING FILM

STORAGE MEMBER

DESCRIPTION

1. Technical Field

The present invention relates to a recording medium which records information by varying optical characteristics of a recording film by applying an external energy, such as light and heat.

2. Background Art

Conventionally, the following have been known as recording media which have oxidation-reduction type recording films, for example.

An optical information recording medium set forth in Japanese Unexamined Patent Publication (KOKAI) No. 2-152,029 employs a laminated film, which includes a metal layer (a first layer), such as Al, Cu and Ag, and a layer (a second layer) including S or Se or mixtures thereof, as a recording film. Further, Japanese Unexamined Patent Publication (KOKAI) No. 60-99,699 discloses a recording medium which includes a carrier and a mixture layer formed on the carrier. The mixture layer includes a low melting point metal, such as one or more of In and Sn, and $MoO_3$ and/or $Ga_2S_3$. Moreover, in the specification of U.S. Pat. No. 5,459,018, a recording medium is disclosed in which a metal, such as Al and Fe, is employed as a first substance and an oxide, such as $TeO_2$ or $In_2O_3$, is employed as a second substance and in which these substances are mixed to make a single layer or are laminated alternately to make a laminated film.

In the optical information recording media having these recording films, the recording films are modified physically and/or chemically by applying a recording laser beam (external energy), thereby varying the optical characteristics, such as reflectance, etc. The recording media can record information by using the variations of the optical characteristics.

However, among these recording media, in those having a recording film formed by the mixture layer of the first substance and the second substance, since the first substance and the second substance are mixed, the first substance and the second substance react with each other slightly even when information is not recorded. Thus, it is easy to think of harsh chronological degradation. In the recording film in which the first substance layer and the second substance layer are laminated, since the contact area between the first substance and the second substance is small, a large energy is required when information is recorded.

It is a first object of the present invention to provide a recording medium which exhibits a high stability, and which hardly requires a large energy when in formation is recorded.

Further preferably, it is an object to provide a recording medium in which the difference between the recorded potions and the unrecorded portions is so clear that the recording medium is good in terms of recording characteristics.

Furthermore preferably, it is an object to provide a recording medium which is produced with ease.

DISCLOSURE OF THE INVENTION

The inventors of the present invention thought of making the recording film a laminated construction of 2 layers or more and reducing the contact area between the first substance and the second substance so that a stable recording medium is less varied chronologically. They also thought that the reaction can be carried out with less energy by melting a first reactant substance layer constituting the recording film in the recording period, and carrying out the reaction in a liquefied state.

And, the inventors thought of functioning the surface of the metal layer as a reflector surface by making the first substance from a metal of high reflectance, to obtain a recording medium of good recording characteristic in which the difference between the recorded portion and the unrecorded portion is more distinct.

Further, the inventors thought of producing a recording medium with ease by making the metal layer two or more compositional portions, or two or more phases of different crystalline states. Thus, the reaction with the second substance occurs only when a predetermined energy is applied, and the reaction does not proceed when producing.

And, regarding the constituent substances of the first layer and the second layer, constituting the recording film, the inventors made various experiments and researches. Thus, the inventor completed the present invention.

Namely, the present invention is characterized in that the first layer includes a metal and/or a substance including the metal, the metal and/or the substance generating energy by 500 kJ or more when it reacts with 1 mol of oxygen molecules (hereinafter referred to as an "oxygen bonding energy"), and exhibiting a melting point or a decomposition temperature of from 100° C. to 300° C.; the second layer includes a substance which includes at least one of an oxide and a substance including oxygen as a constituent element, the oxide or the substance requiring energy by 550 kJ or less when it dissociates 1 mol of oxygen molecules (hereinafter referred to as "oxygen dissociating energy"); and, furthermore, the first layer and the second layer are a combination which causes an exothermic reaction when an external energy is applied.

In the present invention, the first layer is made to have a melting point or a decomposition temperature in the aforementioned range, and accordingly the first layer can be liquefied with a small external energy, the reactivity of the reaction of the both layers (solid phase-liquid phase reaction) is improved. When the melting point or the decomposition temperature of the metal constituting the first layer is less than 100° C., the heat resistance of the recorded data degrades. When it exceeds 300° C., a large external energy is required and is unpreferable.

Further, since the reaction between the both of the layers is an exothermic reaction, the reaction does not proceed in the reverse direction and the retention characteristics of the recorded data can be secured.

When the oxygen bonding energy of the metal, constituting the first layer, is less than 500 kJ, the reactivity degrades, and the contrast deteriorates. Furthermore, when the oxygen dissociating energy of the second layer exceeds 550 kJ, the oxygen is less likely to dissociate, and the reactivity degrades unpreferably.

BEST MODE FOR CARRYING OUT THE INVENTION

Figure 1:
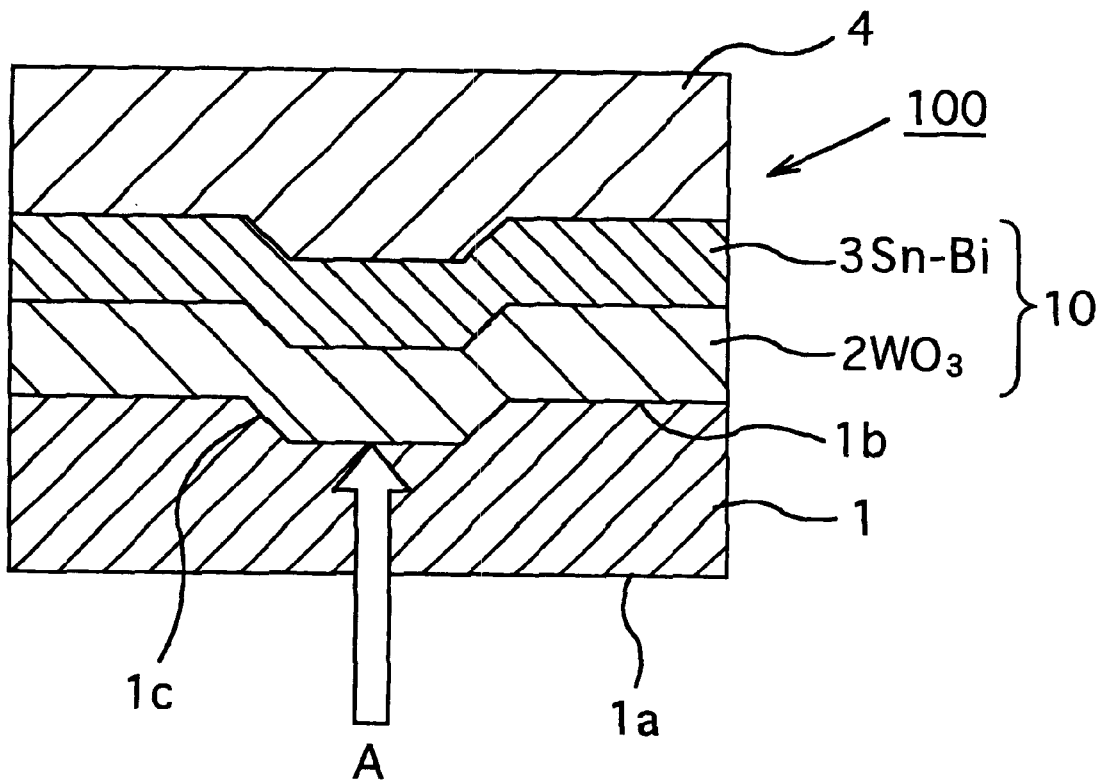
FIG. 1 is a partial cross-sectional construction of an optical disk according to a First Preferred Embodiment of the present invention.

The recording medium of the present invention has a recording film which includes a laminated construction of at least 2 layers. In order to improve the reactivity of the recording film, it is preferable that the first layer and the second layer contact each other.

Further, the metal, constituting the first layer, can preferably include Sn or In at least. These metals and alloys containing these metals have low melting points, and are good in terms of the reflectance on the surface, and can provide high contrast between the recorded portions and the unrecorded portions.

The oxide and the substance including oxygen as a constituent element, constituting the second layer, can preferably include at least one member selected from the group consisting of Mo, W and Ti.

Furthermore, the substance of the first layer can preferably exist as two or more compositional portions, or two or more phases of different crystalline states.

Here, as the metal and/or the substance including at least one of the metals, constituting the first layer, it is possible to employ a substance including at least one member selected from the group consisting of elements of group 1 in the periodic table of elements, elements of group 2 therein, and, Ga, In, Tl, Sn, Pb, As, Sb, Bi, S, Se, Te, Cd and Hg. Here, for example, as the group 1 elements, Li, Na, K, etc., can be listed, and as the group 2 elements, Mg, Ca, etc., can be listed.

Further, as the oxide and the substance including oxygen as a constituent element, constituting the second layer, it is possible to employ a substance including at least one member selected from the group consisting of elements of group 6 in the periodic table of elements, elements of group 8 therein, elements of group 9 therein, elements of group 11 therein, and, Ti, V, Mn, Ni, Re, Cd, Hg, As, Ge, Sn, Pb, As, Sb, Bi, Se, Te, Ce, Pr and Tb. Here, for example, as the group 6 elements, Cr, Mo, W, etc., can be listed; as the group 8 elements, Fe, Ru, etc., can be listed; as the group 9 elements, Co, Rh, Ir, etc., can be listed; and as the group 11 elements, Cu, Ag, Au, etc., can be listed.

Furthermore, the external energy for inducing the reaction is not limited to a laser beam, an ultrasonic wave, or heat, but can be light in general, an electromagnetic wave, an acoustic wave, a radiation, an impact force, and a strain. Of course, the aforementioned preferred forms can be combined appropriately.

Moreover, the first layer can include at least one member selected from the group consisting of an intermetallic compound, nitride, carbide, silicide, boride, sulfide, selenide, telluride, phosphide, arsenide, antimonide, and compounds including these members, as far as it exhibits an oxygen bonding energy of 500 kJ or more, and has a melting point or the decomposition temperature of 100° C. or more and 300° C. or less.

(First Preferred Embodiment)

The optical recording medium of a First Preferred Embodiment is a recording medium in which information is recorded by chemically reacting a recording film by irradiating the film with a recording laser beam as an external energy. This optical recording medium, for example, is applicable to an optical disk in which music or data is recorded.

FIG. 1 illustrates a partial cross-sectional construction of an optical disk (recording medium) 100. This optical disk 100 is formed as a disk as a whole. As illustrated in FIG. 1, a plurality of layers are laminated. 1 designates a transparent substrate, which is formed as a disk (for example, in a thickness of 1.2 mm) and is made from polycarbonate, for instance. A laser beam for optically recording and reading out information enters from a surface 1a of the substrate 1 in the direction specified by the arrow "A". The surface 1a, the laser-beam-entrance side, is a flat surface, and on the other surface 1b, there is formed a spiral or concentric guide groove (track) 1c for leading the laser beam.

On the other surface 1b, there is formed a $WO_3$ film 2 working as a second layer. On the $WO_3$ film 2, there is formed an Sn—43 atomic % Bi film (hereinafter simply referred to as Sn—Bi film) 3. Here, the recording film 10 in the optical disk 100 is constituted by the both films 2 and 3. Further, on the Sn—Bi film 3, there is formed a resin film (resin protective layer) 4, which covers and protects the recording film 10 and which includes an ultraviolet-curing resin.

Here, the oxygen dissociating energy of $WO_3$, forming the $WO_3$ film 2, is about 470 kJ. Further, the melting point of the Sn—Bi of the Sn—Bi film 3 is about 139° C., and the oxygen bonding energy of the Sn—Bi is assumed to be about 610 kJ. And, the reaction of the both films 2 and 3 is an exothermic reaction.

Next, the manufacturing method of the optical disk 100 will be described.

A disk-shaped substrate 1 was prepared which had a thickness of 1.2 mm and which was made from polycarbonate, in which one surface 1a was formed as a flat surface, and the guide groove 1c was formed on the other surface 1b. On the other surface 1b, the $WO_3$ film 2 was formed in a thickness of 176 nm by an RF magnetron sputtering method using a $WO_3$ target under the film forming conditions of sputtering gas spieces (gas pressure ratio): $O_2/(O_2+Ar)=0.1$, sputtering gas pressure: $5 \times 10^{-3}$ Torr, and input electric power: 100–400 W.

Subsequently, without cancelling the vacuum, the Sn—Bi film 3 was formed in a thickness of 70 nm by an RF magnetron sputtering method using an Sn-Bi target under the following film forming conditions of sputtering gas spieces: Ar, sputtering gas pressure: $3 \times 10^{-3}$ Torr, and input electric power: 50–200 W. Finally, the ultraviolet-curing resin was applied by a spin coating method, and the ultraviolet-curing resin was cured using a high-pressure mercury-vapor lamp to form the resin film 4, and thus the optical disk 100 of the First Preferred Embodiment was manufactured.

The recording actions of the optical disk 100 of the First Preferred Embodiment are as hereinafter described. In the portion of the guide groove 1c of the optical disk 100, the recording laser beam is absorbed mainly around the interface between $WO_3$ film 2 and the Sn—Bi film 3, and in the Sn—Bi film 3, and thereby the optical energy is turned into heat. Thus, the portion of the Sn—Bi film 3 which is irradiated with the laser beam melts partially, and simultaneously, depending on the laser beam irradiating conditions, holes are formed in a part of the Sn—Bi film 3, and in addition to this, reactions are induced between the $WO_3$ film 2 and the molten Sn—Bi.

At this moment, oxygen is supplied from $WO_3$ film 2 to the molten Sn—Bi, Sn or Bi, or both of them are turned into the oxides completely or partially. Whilst, all or a part of $WO_3$ takes an oxygen-deficient construction, and is turned into $WO_{2.83}$ film, etc. The $WO_3$ film is a transparent film, the Sn—Bi film is a film which exhibits a metallic gloss, Sn or Bi oxides are blackish, and $WO_{2.83}$ film is a light absorbing film which is observed to be colored in blue.

Before the recording, the reading-out laser beam is reflected sufficiently by the effect of the Sn—Bi film 3, but at the portions where the recording laser beam enters, holes are formed in the Sn—Bi film 3, and especially due to the effect of the $WO_{2.83}$ film, the reading-out laser beam is absorbed, and the light reflection quantity is reduced remarkably with respect to the case prior to the recording. Thus, in the recording film 10, there are formed portions where the light reflection quantities, one of the optical recording characteristics, differ. Due to this operation, data, etc., are recorded in the optical disk 100 of the First Preferred Embodiment.

By the way, since the reaction in the recording film 10 of this preferred embodiment is an exothermic reaction, the reverse reaction does not occur when the reaction once proceeds by the recording laser beam. Accordingly, as a result, the good retention characteristic of the recorded data can be secured.

Further, in the optical disk of the First Preferred Embodiment, a part of the Sn—Bi film 3, where the laser beam is applied, melts at a low temperature of about 139° C. Consequently, the reaction between the $WO_3$ film 2 and the Sn—Bi film 3 induced by heat is a reaction between a solid phase and a liquid phase. This reaction between the solid phase and the liquid phase has an advantage in that the reaction rate is higher than that of a reaction between solid phases, i.e., between a solid phase and a solid phase. Accordingly, as a result, the advantage results in the reduction of the recording laser power and the enhancement of the recording linear speed, and the reactivity of the recording film 10 can be upgraded.

Here, the performance of the recording medium of this preferred embodiment will be described.

In the optical disk 100 which was manufactured by the aforementioned manufacturing method, information was recorded by applying a laser beam of a wavelength: 780 nm, which was focused on the surface of the Sn—Bi film 3, from the side of the flat surface 1$a$ by way of an objective lens of NA (numerical aperture): 0.5. At this moment, irradiating conditions were linear velocity: 2.8 m/sec., recording frequency: 400 kHz and recording laser waveform: rectangular wave of 50% duty ratio.

In this instance, the characteristics of the optical disk 100 were reflectance at unrecorded portions: 45%, recording laser power: 6 mW, C/N: 52 dB and modulation: 90%. Thus, in this preferred embodiment, the data could be recorded with a low recording laser power, and the reactivity of the recording film 10 could be upgraded.

Further, as an environmental resistance test, the optical disk 100 with the data recorded was held at a temperature of 60° C. and at a relative humidity of 60% RH for 48 hours. Thereafter, the C/N, reflectance and modulation were measured again. As a result, within the measurement errors, it could be confirmed that no variations were observed in all of the properties, and thus the optical disk 100 showed a favorable retention characteristic.

Here, the first layer material and the second layer material were combined so that information can be recorded with the low recording power in the recording medium 100 of this preferred embodiment. Nevertheless, even when the Sn—Bi film 3 of low melting point was formed as a first layer after the $WO_3$ film 2 was formed as a second layer, unnecessary reactions were suppressed during film formation. The following are believed to be the reason.

As aforementioned, the oxygen dissociating energy of $WO_3$ is about 470 kJ. On the other hand, the oxygen bonding energy of Sn is 610 kJ, and the oxygen bonding energy of Bi is 410 kJ. Therefore, the reaction of $WO_3$ and Sn is an exothermic reaction, and $WO_3$ and Sn are a combination which is likely to react. Whilst, the reaction of $WO_3$ and Bi is an endothermic reaction, and $WO_3$ and Bi are a combination which is less likely to react.

When the Sn—43 atomic % Bi is employed as the first layer as in the recording medium of this preferred embodiment, the first layer is constituted by two or more areas, for example, a fine area "P" which contains Sn or Sn alloys with a large Sn contents, and a fine area "Q" which contains Bi or Bi alloys with a large Bi contents.

This results from the fact that the Sn—43 atomic % metal is a eutectic metal. The crystal in the area "P" has a cubic structure, and the crystal in the area "Q" has a rhombohedral structure. Hence, in this preferred embodiment, the second $WO_3$ film 2 contacts with the first layer, Sn—Bi film 3, by way of the fine area "P" of high reactivity and the fine area "Q" of low reactivity. Thus, it is believed that the presence of the fine area "Q" suppresses the reactions during the film formation.

(Second Preferred Embodiment)

Except that the substance forming the first layer of the optical disk of the First Preferred Embodiment and the substance forming the second layer thereof were different, an optical disk of the Second Preferred Embodiment was identical with the optical disk of the First Preferred Embodiment in the other arrangements.

The optical disk of the Second Preferred Embodiment employed the same substrate as that of the First Preferred Embodiment. On the surface of the substrate, on which the track was formed, there was formed a nitrogen containing Sn—43 atomic % Bi film (hereinafter simply referred to as N:Sn—Bi film) as a first layer, on this N:Sn—Bi film, there was formed a $WO_3$ film as a second layer. Here, the both films constituted a recording film of this optical disk. On the $WO_3$ film 3, there was formed a resin film adapted to cover and protect the recording film and including an ultraviolet-curing resin.

Here, the reaction of the both films constituting the optical disk of the Second Preferred Embodiment was an exothermic reaction similarly to the First Preferred Embodiment. Further, the melting point of the N:Sn—Bi constituting the N:Sn—Bi film was substantially identical with that of the Sn—Bi. This resulted from the fact that the nitrogen content contained in the N:Sn—Bi film was low.

Next, the manufacturing method of the optical disk of the Second Preferred Embodiment will be described.

A disk made from polycarbonate was prepared which was the same as that of the First Preferred Embodiment. On one surface of the substrate where the track was formed, the N:Sn—Bi film was formed in a thickness of 70 nm by a DC sputtering method using an Sn—43 atomic % Bi target under the film forming conditions of sputtering gas spieces (gas pressure ratio): $N_2/(N_2+Ar)=0.01$, sputtering gas pressure: $5\times10^{-3}$ Torr, and input electric power: 0.5–3 kW.

Subsequently, the $WO_3$ film was formed in a thickness of 20 nm by a high frequency chopper type DC sputtering method using a W target under the following film forming conditions of sputtering gas spieces: $O_2$, sputtering gas pressure: $1\times10^{-2}$ Torr, and input electric power: 3–6 kW. Finally, the ultraviolet-curing resin was applied by a spin coating method, and the ultraviolet-curing resin was cured using a high-pressure mercury-vapor lamp to form the resin film, and thus the optical disk of the Second Preferred Embodiment was manufactured.

The recording actions of the optical disk of the Second Preferred Embodiment are as hereinafter described. The recording laser beam, which is applied from the flat surface of the optical disk substrate to the track-shaped guide groove portion, is absorbed mainly in the N:Sn—Bi film, and thereby the optical energy is turned into heat. Thus, a portion of the N:Sn—Bi film, which is irradiated with the laser beam, melts partially or wholly. Simultaneously, holes are formed in a part of the N:Sn—Bi film, and reactions are induced between the $WO_3$ film and the molten N:Sn—Bi film.

At this moment, oxygen is supplied from the $WO_3$ film to the molten N:Sn—Bi film, and Sn or Bi, or both of them are turned into oxides completely or partially. Whilst, all or a part of $WO_3$ film takes an oxygen-deficient construction, and is turned into $WO_{2.83}$ film, etc. The $WO_3$ film is a transparent film, N:Sn—Bi film is a film which exhibits a metallic gloss, Sn or Bi oxides are blackish, and $WO_{2.83}$ film is a light absorbing film which is observed to be colored in blue.

Before the recording, the reading-out laser beam is reflected sufficiently by the effect of the N:Sn—Bi film, but at the portions where the recording laser beam enters, holes are formed in the N:Sn—Bi film, and especially due to the effect of the $WO_{2.83}$ film, the reading-out laser beam is absorbed, and the light reflection quantity is reduced remarkably with respect to the case prior to the recording. Thus, in the recording film, there are formed portions where the light reflection quantities differ. Due to this operation, data, etc., are recorded in the optical disk of the Second Preferred Embodiment.

Since the aforementioned reaction is an exothermic reaction in the Second Preferred Embodiment similarly to the optical disk of the First Preferred Embodiment, it results in the improvement in the thermal stability of the recorded data, etc., thereby securing the retention characteristic of the recorded data. Further, since the reaction in the recording film of the optical disk of Second Preferred Embodiment is also the reaction between the solid phase and the liquid phase, there arises an advantage in that the reaction rate is higher than the reaction between solid phases. Accordingly, it is possible to reduce the recording laser power and to improve the recording linear velocity.

Here, the performance of the optical disk of the Second Preferred Embodiment will be described.

In the optical disk of the Second Preferred Embodiment, information was recorded by applying a laser beam of a wavelength: 780 nm, which was focused on the N:Sn—Bi film, from the side of the flat surface of the substrate by way of an objective lens of NA: 0.5. At this moment, irradiating conditions were linear velocity: 5.6 m/sec., recording frequency 800 kHz and recording laser waveform: rectangular wave of 50% duty ratio.

The characteristics of the optical disk were reflectance at unrecorded portions: 55%, recording laser power: 8 mW, C/N: 54 dB and modulation: 68%. Thus, in the Second Preferred Embodiment, despite the fact that the linear velocity was high, the data could be recorded with a relatively low laser power.

Further, as an environmental resistance test, the optical disk with the data recorded was held at a temperature of 60° C. and at a relative humidity of 80% RH for 48 hours. Thereafter, the C/N, reflectance and modulation were measured again. As a result, within the measurement errors, it could be confirmed that no variations were observed in all of the properties, and thus the optical disk showed a favorable retention characteristic.

Here, it is assumed that, since the Sn—Bi film containing nitrogen is employed as the first layer, the optical disk of the Second Preferred Embodiment exhibited a favorable tendency in terms of the environmental resistance.

(Third Preferred Embodiment)

An optical disk of the Third Preferred Embodiment differs from the optical disk of the Second Preferred Embodiment in that an Sn—42.5 atomic % Bi—1 atomic % Ge film (hereinafter simply referred to as Sn—Bi—Ge film) is used instead of the N:Sn—Bi film of the optical disk of the Second Preferred Embodiment. The other arrangements are identical with those of the optical disk of the Second Preferred Embodiment.

The oxygen dissociating energy of $WO_3$ forming the $WO_3$ film is about 470 kJ. Whilst, the melting point of Sn—Bi—Ge forming the Sn—Bi—Ge film is about 140° C., and the oxygen bonding energy thereof is assumed to be about 610 kJ. Therefore, the reaction of these films is an exothermic reaction.

The optical disk of the Third Preferred Embodiment was manufactured in the following manner.

A polycarbonate substrate was prepared which was identical with that of the optical disk of the First Preferred Embodiment. On the surface of the substrate having the track, the Sn—Bi—Ge film was first formed in a thickness of 70 nm by a DC sputtering method using an Sn—42.5 atomic % Bi—1 atomic % Ge target under the film forming conditions of sputtering gas spieces: Ar, sputtering gas pressure: $5 \times 10^{-3}$ Torr, and input electric power: 0.5–3 kW.

Subsequently, in the same manner as the Second Preferred Embodiment, a $WO_3$ film was formed in a thickness of 20 nm, and finally, a resin film was formed, thereby manufacturing an optical disk.

The functions of the optical disk of the Third Preferred Embodiment are identical with those of the optical disk of the Second Preferred Embodiment.

Further, in the case of the optical disk of the Third Preferred Embodiment as well, since the reaction of the recording film is an exothermic reaction similarly to the optical disks of the First and Second Preferred Embodiments, it results in the improvement in the thermal stability of the recorded data, etc., thereby securing the retention characteristic of the recorded data. Furthermore, since the reaction is also the reaction between the solid phase and the liquid phase, there arises an advantage in that the reaction rate is higher than the reaction between simple solid phases. Thus, the reaction contributes to reducing the recording laser power and to improving the recording linear velocity.

Here, the performance of the recording medium of the Third Preferred Embodiment will be described.

In the optical disk manufactured by the aforementioned manufacturing process, information was recorded by applying a laser beam of a wavelength: 780 nm, which was focused on the surface of the Sn—Bi—Ge film, from the side of the flat surface of the substrate by way of an objective lens of NA: 0.5. At this moment, irradiating conditions were linear velocity: 5.6 m/sec., recording frequency 800 kHz and recording laser waveform: rectangular wave of 50% duty ratio.

The characteristics of the optical disk were reflectance at unrecorded portions: 55%, recording laser power: 8 mW, C/N: 55 dB and modulation: 70%. Thus, in the optical disk of the Third Preferred Embodiment as well, the data could be recorded with a relatively low recording laser power.

Further, as an environmental resistance test, the optical disk with the data recorded was held at a temperature of 60° C. and at a relative humidity of 85% RH for 48 hours. Thereafter, the C/N, reflectance and modulation were measured again. As a result, within the measurement errors, it could be confirmed that no variations were observed in all of the properties, and thus the optical disk showed a favorable retention characteristic.

Here, it is assumed that since the Sn—Bi film, which contains Ge in a small amount, is employed as the first layer, the optical disk of the Third Preferred Embodiment exhibited a favorable tendency in the environmental resistance with respect to the humidity. It is believed that in a highly humid environment, Ge, which is more likely to be oxidized by the humidity than Sn and Bi, is selectively oxidized in the interface of the film, and accordingly the Ge oxides cover the Sn—Bi—Ge film 22 as a very thin layer, and, as a result, work to inhibit the oxidation in the inside of the film.

(Fourth Preferred Embodiment)

The optical disk of the Fourth Preferred Embodiment differs from the optical disk of the Second Embodiment in that an In—20 atomic % Pb film (hereinafter simply referred to as In—Pb film) is employed instead of the N:Sn—Bi film of the optical disk of the Second Preferred Embodiment, and in that $MoO_3$ film is employed instead of the $WO_3$ film. Here, the oxygen dissociating energy of $MoO_3$ forming the $MoO_3$ film is about 330 kJ. Whilst, the melting point of the In—Pb forming the In—Pb film is about 180° C., and the oxygen bonding energy thereof is about 640 kJ. The reaction of both of these films is an exothermic reaction.

The optical disk of the Fourth Preferred Embodiment was manufactured in the following manner.

A polycarbonate substrate was prepared which was identical with that of the optical disk of the First Preferred Embodiment. On the surface of the substrate having the track groove, the In—Pb film was first formed in a thickness of 45 nm by a DC sputtering method by an In—20 atomic % Pb target under the film forming conditions of sputtering gas spieces: Ar, sputtering gas pressure: $5\times10^{-3}$ Torr, and input electric power: 0.5 kW.

Subsequently, the $MoO_3$ film was formed in a thickness of 20 nm by a high frequency chopper type DC sputtering method using an Mo target under the following film forming conditions of sputtering gas spieces: $O_2$, sputtering gas pressure: $1\times10^{-2}$ Torr, and input electric power: 3–6 kW. Finally, the ultraviolet-curing resin was applied by a spin coating method, and the ultraviolet-curing resin was cured using a high-pressure mercury-vapor lamp to form the resin film, and thus the optical disk was manufactured.

Here, the optical disk of the Fourth Preferred Embodiment differs from the optical disks of the First, Second and Third Preferred Embodiments in that the single phase In—Pb film was employed as the first layer. Nevertheless, the In—Pb film and the $MoO_3$ film did not react during the film formation. This is assumed to result from the following facts. The In—Pb film was formed prior to the $MoO_3$ film, and the melting point of the In—Pb film was relatively high.

The recording actions of the optical disk of this preferred embodiment are as hereinafter described. The recording laser beam is absorbed mainly in the In—Pb film, and thereby the optical energy is turned into heat. Thus, a portion of the In—Pb which is irradiated with the laser beam, melts partially or wholly. Simultaneously, holes are formed in a part of the In—Pb film, and reactions are induced between the $MoO_3$ film and the molten In—Pb.

At this moment, oxygen is supplied from $MoO_3$ film to the molten In—Pb, all of or a part of In is turned into the oxides. Whilst, all or a part of $MoO_3$ film suffers the oxygen deficiency, and is turned into $Mo_{3-x}$ ($2 \leq x<3$) film. The $MoO_3$ film is a transparent film, In—Pb is a film which exhibits a metallic gloss, In oxides are blackish, and $MoO_2$ film is a light absorbing film which is observed to be colored in blue.

Before the recording, the reading- out laser beam is reflected sufficiently by the effect of the In—Pb film, but at the portions where the recording laser beam enters, holes are formed in the In—Pb film, and especially due to the effect of the $MoO_{3-x}$ film, and it is assumed that the reading-out laser beam is absorbed, and that the light reflection quantity is reduced remarkably with respect to the case prior to the recording. Thus, in the recording film, there are formed portions where the light reflection quantities differ. Due to this operation, data, etc., are recorded in the optical disk the Fourth Preferred Embodiment.

In the case of the optical disk of the Fourth Preferred Embodiment as well, since the aforementioned reaction is an exothermic reaction similarly to the optical disks of the First, Second and Third Preferred Embodiments, it results in the improvement in the thermal stability of the recorded data, etc., thereby securing the retention characteristic of the recorded data. Furthermore, since the reaction is also the reaction between the solid phase and the liquid phase, there arises an advantage in that the reaction rate is higher than the reaction between simple solid phases. Accordingly, it is possible to reduce the recording laser power and to improve the recording linear velocity. Thus, it is possible to improve the reactivity of the recording film.

Here, the performance of the recording medium of the Fourth Preferred Embodiment will be described.

In the optical disk of the Fourth Preferred Embodiment, information was recorded by applying a laser beam of a wavelength: 780 nm, which was focused on the surface of the In—Pb film, from the side of the flat surface of the substrate by way of an objective lens of NA: 0.5. At this moment, irradiating conditions were linear velocity: 2.8 m/sec., recording frequency 400 kHz and recording laser waveform: rectangular wave of 50% duty ratio.

In this instance, the characteristics of the optical disk were reflectance at unrecorded portions: 55%, recording laser power: 8 mW, C/N: 49 dB and modulation: 80%. Thus, in the Fourth Preferred Embodiment as well, the data could be recorded with a relatively low laser power.

Further, as an environmental resistance test, the optical disk with the data recorded was held at a temperature of 70° C. and at a relative humidity of 95% RH for 48 hours. Thereafter, the C/N, reflectance and modulation were measured again. As a result, within the measurement errors, it could be confirmed that no variations were observed in all of the properties, and thus the optical disk showed a favorable recorded data retention characteristic.

Here, it is assumed that since the In—Pb film, which is less likely to be oxidized to the inside by the humidity, is employed as the first layer, the optical disk of the Fourth Preferred Embodiment exhibited a favorable tendency in the environmental resistance with respect to the humidity.

(Fifth Preferred Embodiment)

An optical disk of the Fifth Preferred Embodiment employed a substrate whose groove width and depth were different. The other portions were identical with those of the optical disk of the First Preferred Embodiment. For instance, the substrate of the optical disk of the Fifth Preferred Embodiment had a groove width of 500 nm and a groove depth of 35 nm.

The optical disk of the Fifth Preferred Embodiment is characterized in that after data are recorded using a data recording apparatus whose wavelength was 780 nm and whose objective lens's NA was 0.50, the data can be read out using either one of a data reading-out apparatus whose wavelength was 780 nm and whose objective lens's NA was 0.45, or the other data reading-out apparatus whose wavelength was 650 nm and whose objective lens's NA was 0.35. This implies an unprecedented feature that, after data are recorded with a CD-R writer, the data can be read out by either one of apparatuses, a CD-ROM or a DVD-ROM.

Note that the configuration of the guide groove on the substrate, which effects the above characteristics, is not limited to the aforementioned values. Suppose that a reading-out apparatus whose wavelength is 650 nm and whose objective lens's NA is $\alpha$, the groove width w (units: nm) and the groove depth d (units: nm) can preferably fall in the following ranges, respectively:

the groove width w is 400 or more, and is $(1749.5-3996.4\times\alpha+2416.9\times\alpha^2)$ or less; and the groove depth d is $\{48.6-11.21\times(w/100)+1.41\times(w/100)^2\}$ or more, and is $\{280.9-839.8\times\alpha+761.1\times\alpha^2-18.96\times(w/100)+18.32\times\alpha\times(w/100)+0.86\times(w/100)^2\}$ or less.

Note that it is possible to make a recording medium which comprises a PET (polyethylene terephthalate) film used as a substrate, a Ga—Sn—Au film (first layer) whose composition is 8.8 atomic % of Ga, 18.8 atomic % of Sn and 72.4% atomic % of Au, a $WO_3$ film (second layer), a transparent protective film (resin protective layer), and a sticky layer wherein the Ga—Sn—Au film, the $WO_3$ film and the protective film are formed on one surface of the substrate, while the sticky layer is formed on the other surface. This recording medium can be used by applying it on arbitrary places after recording data and images.

Here, in the Ga—Sn—Au film, the melting point is about 255° C., the oxygen bonding energies are about 740 kJ for Ga and about 610 kJ for Sn, the oxygen bonding energy of the Ga—Sn—Au film is 500 kJ or more. Further, the reaction between the Ga—Sn—Au film and the $WO_3$ film is an exothermic reaction.

Moreover, an In—48.3 atomic % Sn film can be used as the first layer. The melting point of this film is 120° C., and the oxygen bonding energies are about 640 kJ for In and about 610 kJ for Sn.

What is claimed is:

1. A recording medium having a recording film, said recording film comprising at least a first layer and a second layer laminated, and said first layer and said second layer reacting each other upon application of an external energy to vary an optical characteristic of said recording film to record information, characterized in that:

said first layer comprises at least one member selected from the group consisting of a metal and a substance including the metal, said metal or said substance including the metal generating energy by 500 kJ or more when said metal or said substance reacts with 1 mol of oxygen molecules, and having a melting point or a decomposition temperature of from 100 to 300° C.;

said second layer comprises at least an oxide or a substance including oxygen as a constituent element, said oxide or said substanace including oxygen requiring energy by 550 kJ or less when said oxide or said substance dissociates 1 mol of oxygen molecules; and said reaction of said first layer and said second layer is an exothermic reaction.

2. The recording medium according to claim 1, wherein the metal constituting said first layer includes at least Sn or In.

3. The recording medium according to claim 1, wherein the oxide and the substance including oxygen constituting said second layer includes at least one member selected from the group consisting of Mo, W and Ti.

4. The recording medium according to claim 1, wherein the substance of said first layer includes two or more compositional portions, or two or more phases of different crystalline states.

* * * * *